(12) United States Patent
Neathery et al.

(10) Patent No.: US 11,599,243 B1
(45) Date of Patent: Mar. 7, 2023

(54) SYSTEM AND METHOD FOR ACTIVATING SCREEN CLEANING MODE FOR USER INTERFACE

(71) Applicant: Caterpillar Inc., Peoria, IL (US)

(72) Inventors: Brian Philip Neathery, Hockley, TX (US); Thomas J. Hale, Hockley, TX (US); Keith Folken, West Peoria, IL (US); Meghna Prasad, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/453,388

(22) Filed: Nov. 3, 2021

(51) Int. Cl.
*G06F 3/0482* (2013.01)
*G06F 9/451* (2018.01)
*G06F 3/04847* (2022.01)
*G06F 3/04817* (2022.01)

(52) U.S. Cl.
CPC ........ *G06F 3/0482* (2013.01); *G06F 3/04817* (2013.01); *G06F 3/04847* (2013.01); *G06F 9/451* (2018.02)

(58) Field of Classification Search
CPC .... G06F 9/451; G06F 3/04817; G06F 3/0482; G06F 3/04847; G06F 3/0416; G06F 3/0412; G06F 3/041; G06F 3/0393; G06F 3/04886; G06F 3/0488; G06F 2203/04104
See application file for complete search history.

(56) References Cited

U.S. PATENT DOCUMENTS

| | | | |
|---|---|---|---|
| 5,526,422 A * | 6/1996 | Keen | H04M 3/42 379/396 |
| 6,208,331 B1 | 3/2001 | Singh et al. | |
| 2010/0033444 A1 * | 2/2010 | Kobayashi | G06F 3/0488 345/173 |
| 2010/0045623 A1 * | 2/2010 | Sakurai | G06F 3/0416 345/173 |
| 2010/0225662 A1 | 9/2010 | Nakayama | |
| 2015/0123912 A1 * | 5/2015 | Nikolic | G01C 23/00 345/173 |
| 2017/0270258 A1 | 9/2017 | Duckert et al. | |
| 2018/0059881 A1 * | 3/2018 | Agboatwalla | G06F 3/0482 |
| 2019/0302957 A1 | 10/2019 | Nagira | |

(Continued)

FOREIGN PATENT DOCUMENTS

| | | | |
|---|---|---|---|
| JP | 08263215 | | 10/1996 |
| JP | 2004355078 A | * | 12/2004 |
| JP | 2020135251 A | * | 8/2020 |

*Primary Examiner* — Mong-Shune Chung
(74) *Attorney, Agent, or Firm* — von Briesen & Roper, s.c.

(57) ABSTRACT

A system for activating a screen cleaning mode for a user interface associated with a work machine includes a display screen associated with the user interface, the display screen being configured to display a control panel including a plurality of control icons for controlling one or more operations of the work machine. The system also includes a controller communicably coupled to the display screen. The controller is configured to receive a user input for activating the screen cleaning mode. The controller is also configured to switch the control panel to an inactive state. The control panel is switched to the inactive state based on a masking of the plurality of control icons. The controller is further configured to display a clean-up panel on the display screen. The clean-up panel includes a screen clean timer and a deactivation icon for deactivating the screen cleaning mode.

15 Claims, 6 Drawing Sheets

(56) References Cited

U.S. PATENT DOCUMENTS

| | | | |
|---|---|---|---|
| 2019/0361600 A1* | 11/2019 | Matsuda | G06F 1/3215 |
| 2021/0216067 A1* | 7/2021 | Noguchi | G06F 3/04886 |
| 2021/0322592 A1* | 10/2021 | Mattioli | G09G 3/32 |
| 2021/0377402 A1* | 12/2021 | Kohara | H04N 1/00896 |

* cited by examiner

SYSTEM AND METHOD FOR ACTIVATING SCREEN CLEANING MODE FOR USER INTERFACE

TECHNICAL FIELD

The present disclosure relates to a system and a method for activating a screen cleaning mode for a user interface.

BACKGROUND

Work machines, such as, earth-moving machines, marine machines, and the like, may include a user interface for controlling one or more work operations associated with the work machines. The user interface may be disposed at an operator station of the work machine. Further, the user interface may be accessed by a machine operator or other personnel in charge of servicing the work machine. Such user interface typically employ touch screen technologies. Over a period of time, dirt, debris, and/or skin oils may render a display screen of the user interface unusable or invisible due to a nature of the touch screen technology. Thus, the user interface may have to be periodically cleaned to ensure that various control icons on the display screen are clearly visible and operable by the machine operator or other personnel.

Cleaning of such user interfaces typically includes usage of a piece of cloth and a liquid. In some cases, the user interface may have to be cleaned when the work machine is in operation without causing any disturbance to ongoing work operations. However, when a cleaning process of the user interface is in progress, there may be a possibility that a personnel in charge of the cleaning process may inadvertently engage or disengage one or more components and/or systems of the work machine. Such inadvertent engagement or disengagement may cause the work machine to perform unwanted operations.

Therefore, it may be desirable to have a system and a method that eliminates any unintentional usage of the user interface during the cleaning process of the user interface.

U.S. Pat. No. 6,208,331 describes a method for cleaning a touch screen display in a touch screen device without inadvertently activating a feature or inputting unwanted data by touching the touch screen display. The method operates by entering a clean touch screen mode wherein individual touches of the touch screen display are not recognized by the touch screen device. This allows the user to clean the touch screen display by wiping it with a cloth without inadvertently activating a feature or inputting unwanted data. The touch screen display turns bright white when it is in the clean touch screen mode to illuminate dirt and oil on the touch screen display to allow for easier cleaning of the touch screen display. The touch screen device exits the clean touch screen mode in response to input from the user. The user can depress any key on a keyboard attached to the touch screen device or the user can simultaneously touch opposite corners of the touch screen display to exit the clean touch screen mode. The touch screen device will also exit the clean touch screen mode after a predetermined amount of time without input from the user.

SUMMARY OF THE DISCLOSURE

In one aspect of the present disclosure, a system for activating a screen cleaning mode for a user interface associated with a work machine is provided. The system includes a display screen associated with the user interface. The display screen is configured to display a control panel including a plurality of control icons for controlling one or more operations of the work machine. The system also includes a controller communicably coupled to the display screen. The controller is configured to receive a user input for activating the screen cleaning mode from a user. The controller is also configured to switch the control panel to an inactive state based on the user input. The control panel is switched to the inactive state based on a masking of the plurality of control icons. The controller is further configured to display a clean-up panel on the display screen based on the switching of the control panel to the inactive state. The clean-up panel includes a screen clean timer and a deactivation icon for deactivating the screen cleaning mode.

In another aspect of the present disclosure, a method for activating a screen cleaning mode for a user interface associated with a work machine is provided. The user interface includes a display screen configured to display a control panel including a plurality of control icons for controlling one or more operations of the work machine. The method includes receiving, by a controller, a user input for activating the screen cleaning mode from a user. The method also includes switching, by the controller, the control panel to an inactive state based on the user input. The control panel is switched to the inactive state based on a masking of the plurality of control icons. The method further includes displaying, by the controller, a clean-up panel on the display screen based on the switching of the control panel to the inactive state. The clean-up panel includes a screen clean timer and a deactivation icon for deactivating the screen cleaning mode.

In yet another aspect of the present disclosure, a user interface associated with a work machine is provided. The user interface includes a display screen configured to display a control panel including a plurality of control icons for controlling one or more operations of the work machine. The user interface also includes a controller communicably coupled to the display screen. The controller is configured to activate a screen cleaning mode for the display screen. The controller is configured to receive a user input for activating the screen cleaning mode from a user. The controller is also configured to switch the control panel to an inactive state based on the user input. The control panel is switched to the inactive state based on a masking of the plurality of control icons. The controller is further configured to display a clean-up panel on the display screen based on the switching of the control panel to the inactive state. The clean-up panel includes a screen clean timer and a deactivation icon for deactivating the screen cleaning mode.

Other features and aspects of this disclosure will be apparent from the following description and the accompanying drawings.

DETAILED DESCRIPTION

Wherever possible, the same reference numbers will be used throughout the drawings to refer to the same or like parts. Wherever possible, corresponding or similar reference numbers will be used throughout the drawings to refer to the same or corresponding parts.

Figure 1:
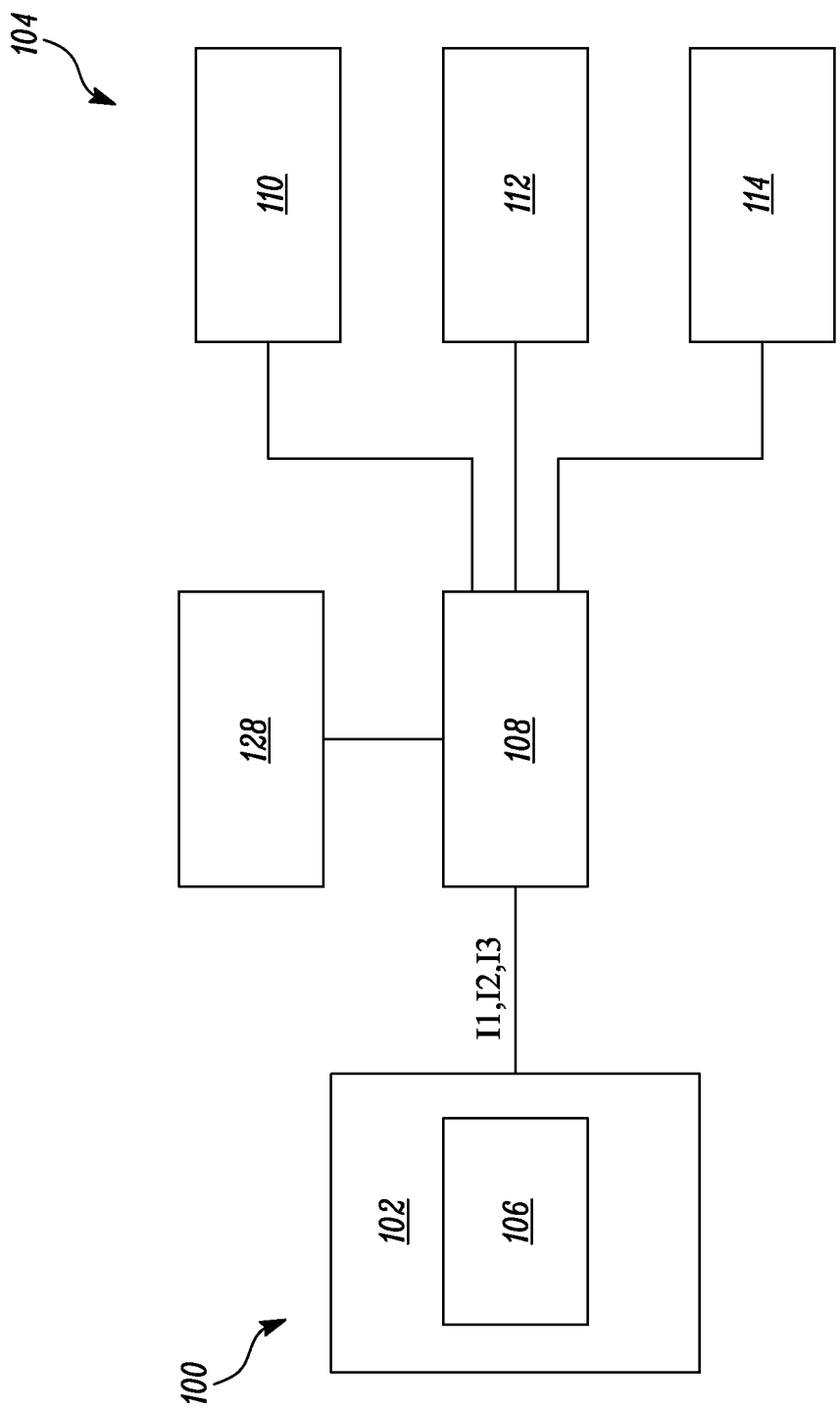
FIG. 1 illustrates a block diagram of a system for activating a screen cleaning mode for a user interface associated with a work machine, according to examples of the present disclosure.

FIG. 1 illustrates a block diagram of a system 100 for activating a screen cleaning mode for a user interface 102 associated with a work machine 104. The system 100 includes a display screen 106 associated with the user interface 102. The system 100 also includes a controller 108 communicably coupled to the display screen 106. Further, the work machine 104 may be embodied as any movable machine known in the art, such as, an earth-moving machine, a marine machine, a passenger vehicle, and the like. The work machine 104 may include a power source 110, a transmission system 112, a propulsion system 114 for propelling the work machine 104, and the like. In an example, the earth-moving machine may include ground engaging members, such as, wheels or tracks, to propel the earth-moving machine on ground surfaces. In another example, the marine machine may include propellers for moving the marine machine in water bodies.

Figure 2:
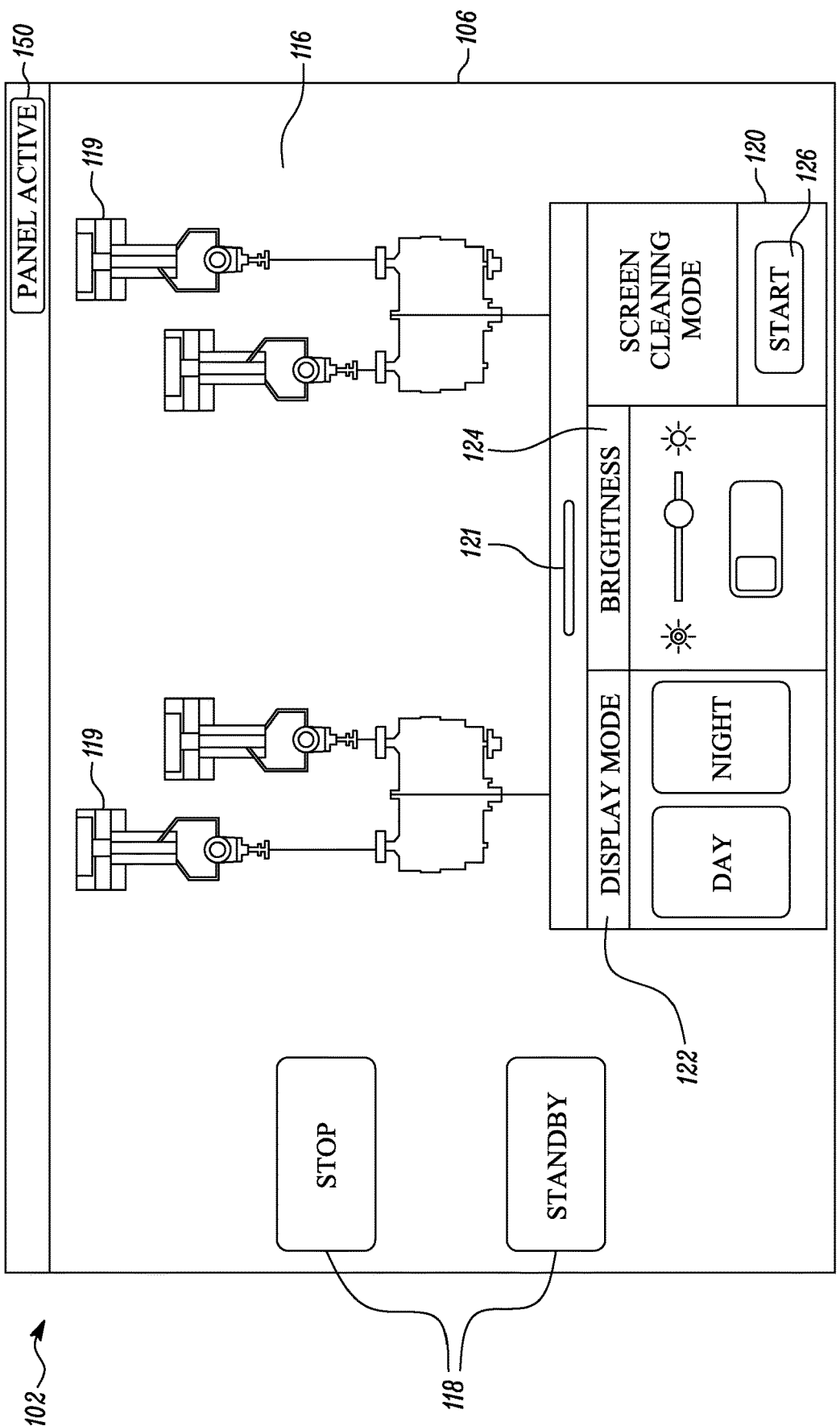
FIG. 2 illustrates a display screen associated with the user interface, according to examples of the present disclosure.

The work machine 104 also includes an operator station (not shown). The user interface 102 may be disposed at the operator station. The user interface 102 may embody an input/output device that may allow a machine operator to control the work machine 104. As shown in FIG. 2, the user interface 102 includes the display screen 106 that displays a control panel 116 including a number of control icons 118 for controlling one or more operations of the work machine 104. The display screen 106 may include an electroluminescent display, a liquid crystal display (LCD), a light-emitting diode (LED) display, a thin-film transistor (TFT), and the like. Further, the display screen 106 may include a portable handheld device, such as, a mobile phone, a tablet, and the like. The display screen 106 may embody a touch screen device.

In some examples, the control icons 118 on the control panel 116 may be used to activate or deactivate one or more components associated with the work machine 104. For example, the control icons 118 may be used to activate or deactivate the power source 110, provide inputs to the propulsion system 114 for propelling the work machine 104 at a desired velocity, and the like. The control panel 116 is illustrated in an active state herein. Further, the control panel 116 may include one or more graphical representations 119. The graphical representations 119 may correspond to illustrations of one or more components of the work machine 104.

Further, the control panel 116 may include a quick settings panel 120. The quick settings panel 120 may be displayed on the control panel 116 based on a swipe-up action performed by a user on a tab 121 present on the control panel 116. The user may include the machine operator, a personnel in charge of cleaning the user interface 104, or any other personnel in charge of servicing the work machine 104. The quick settings panel 120 may include a first setting icon 122 to change a display mode of the display screen 106. For example, the user may use the first setting icon to switch between a day mode and a night mode. The quick settings panel 120 may also include a second setting icon 124 to adjust a brightness of the display screen 106. It should be noted that the control panel 116 may include additional icons (not shown herein) to control one or more settings of the display screen 106, without any limitations.

The quick settings panel 120 may also include a section to activate the screen cleaning mode. The quick settings panel 120 includes a text "SCREEN CLEAN" provided thereon. Further, the quick settings panel 120 may include an activation icon 126. The activation icon 126 may be provided proximate to the text "SCREEN CLEAN". The activation icon 126 may be used to activate the screen cleaning mode for the display screen 106. The activation icon 126 includes a text "START" provided thereon. The texts "SCREEN CLEAN" and "START" may provide an indication to the user regarding a purpose of the activation icon 126. Alternatively, the activation icon 126 may include any other text or graphic provided thereon, without any limitations.

Further, the user interface 102 also includes the controller 108 (see FIG. 1) communicably coupled to the display screen 106. The controller 108 activates the screen cleaning mode for the display screen 106. In an example, the controller 108 may be an integral component of the user interface 102. In another example, the controller 108 and the user interface 102 may be embodied as separate components.

The controller 108 includes a memory 128 (see FIG. 1). The memory 128 may include a flash memory, a random-access memory (RAM), an electrically erasable programmable read-only memory (EEPROM), and the like. The memory 128 may be used to store data, such as, algorithms, instructions, arithmetic operations, and the like. The controller 108 may execute various types of digitally-stored instructions, such as, a software or an algorithm, retrieved from the memory 128, or a firmware program which may enable the controller 108 to perform a wide variety of operations.

The controller 108 may embody a single microprocessor or multiple microprocessors for receiving various input signals from various components of the work machine 104. Numerous commercially available microprocessors may be configured to perform the functions of the controller 108. It should be appreciated that the controller 108 may embody a machine controller capable of controlling numerous machine functions. The controller 108 may include a central processing unit, a graphics processing unit, and the like. The controller 108 may also include a processing logic, such as, a field-programmable gate array (FPGA), an application-specific integrated circuit (ASIC), and the like.

Further, the controller 108 receives a user input "I1" (see FIG. 1) for activating the screen cleaning mode from the user. The controller 108 switches the control panel 116 to an inactive state based on the user input "I1". The user input "I1" is provided to the controller 108 based on the pressing of the activation icon 126.

Figure 3:
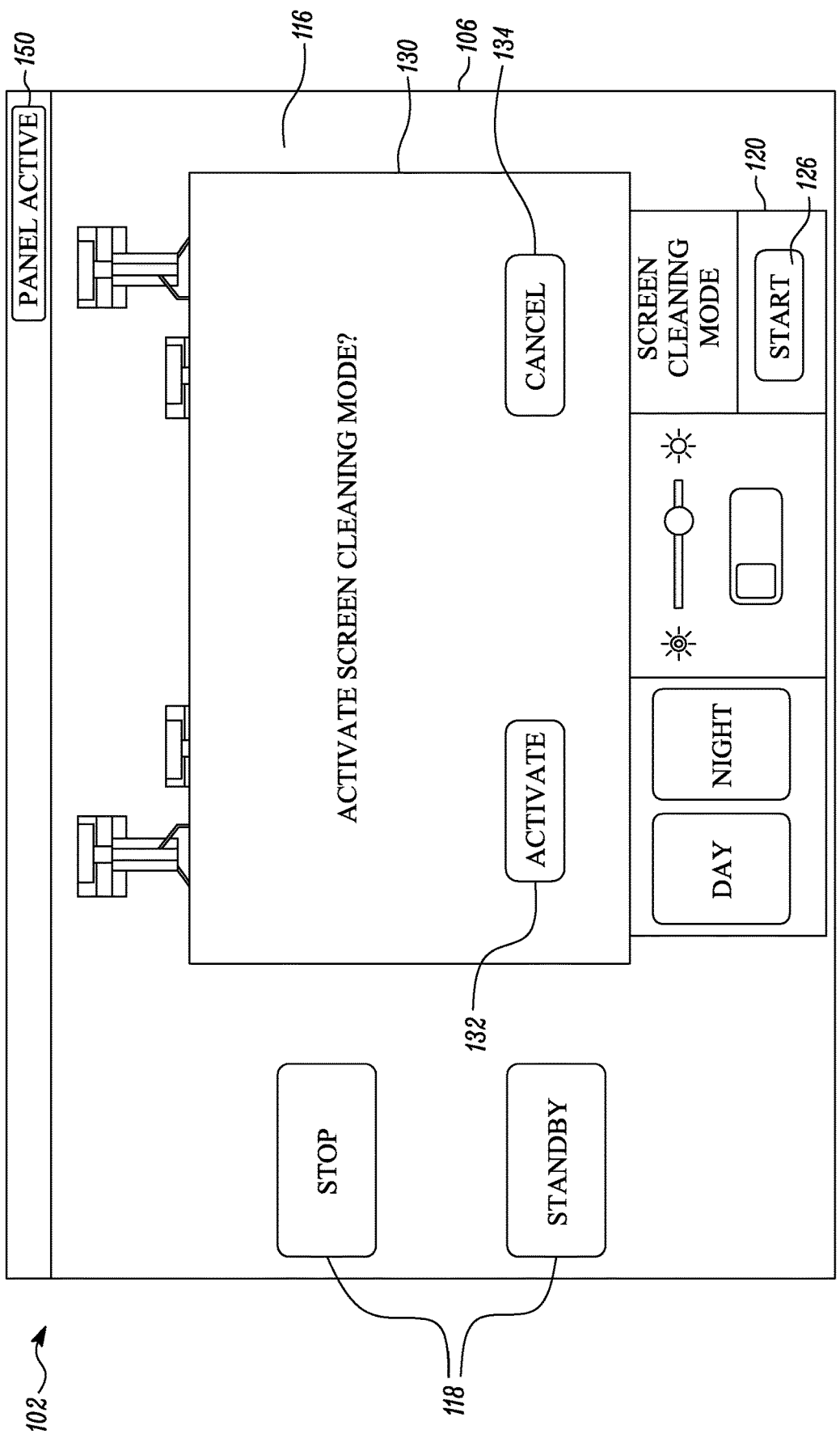
FIG. 3 illustrates a first prompt screen displayed on the display screen of FIG. 2, according to examples of the present disclosure.

Referring to FIG. 3, the user input "I1" (see FIG. 1) to the activation icon 126 causes a first prompt screen 130 to be displayed on the display screen 106. More particularly, based on receipt of the user input "I1", the controller 108 (see FIG. 1) may generate an output to display the first prompt screen 130 on the display screen 106. The first prompt screen 130 allows the activation of the screen cleaning mode for a first predetermined period of time. The first predetermined period of time may be from about 30 seconds to about 120 seconds. Further, the controller 108 may deactivate the screen cleaning mode after the first predetermined period of time and switch the control panel 116 to the active state.

Furthermore, the first predetermined period of time may be prestored in the memory 128 associated with the controller 108. Moreover, the first predetermined period of time may be configurable based on an input "I2" (see FIG. 1) from the user. The user may be able to adjust the first predetermined period of time based on accessing a settings window (not shown) associated with the display screen 106. The settings window may provide a virtual keyboard that may allow the user to adjust the first predetermined period of time.

As illustrated in FIG. 3, the first prompt screen 130 includes a first icon 132 and a second icon 134. The first prompt screen 130 also includes a text "ACTIVATE SCREEN CLEANING MODE?" provided thereon. Alternatively, the first prompt screen 130 may include any other text, without any limitations. Further, the first icon 132 may allow the user to continue with the activation of the screen cleaning mode. The first icon 132 may include a text "ACTIVATE" provided thereon for notifying the user regarding a purpose of the first icon 132. Moreover, an input to the first icon 132 of the first prompt screen 130 may switch the control panel 116 to the inactive state. Further, the control panel 116 is switched to the inactive state based on a masking of the number of control icons 118. It should be noted that the controller 108 may mask the control icons 118 to render the control panel 116 inactive based on a logic or a program. It should be noted that any known in the art logic or program may be run by the controller 108 to mask the control icons 118. Such a logic or program may be stored in the memory 128 and may be retrieved by the controller 108 therefrom.

Further, the second icon 134 may allow the user to cancel the activation of the screen cleaning mode. The second icon 134 may include a text "CANCEL" provided thereon for notifying the user regarding a purpose of the second icon 134. It should be noted that the first and second icons 132, 134 may include any other texts or graphics that notifies the user regarding the purpose of the second icon 134, as per application requirements. For example, the second icon 134 may include a graphic, such as, a cross sign or a stop sign.

Figure 4:
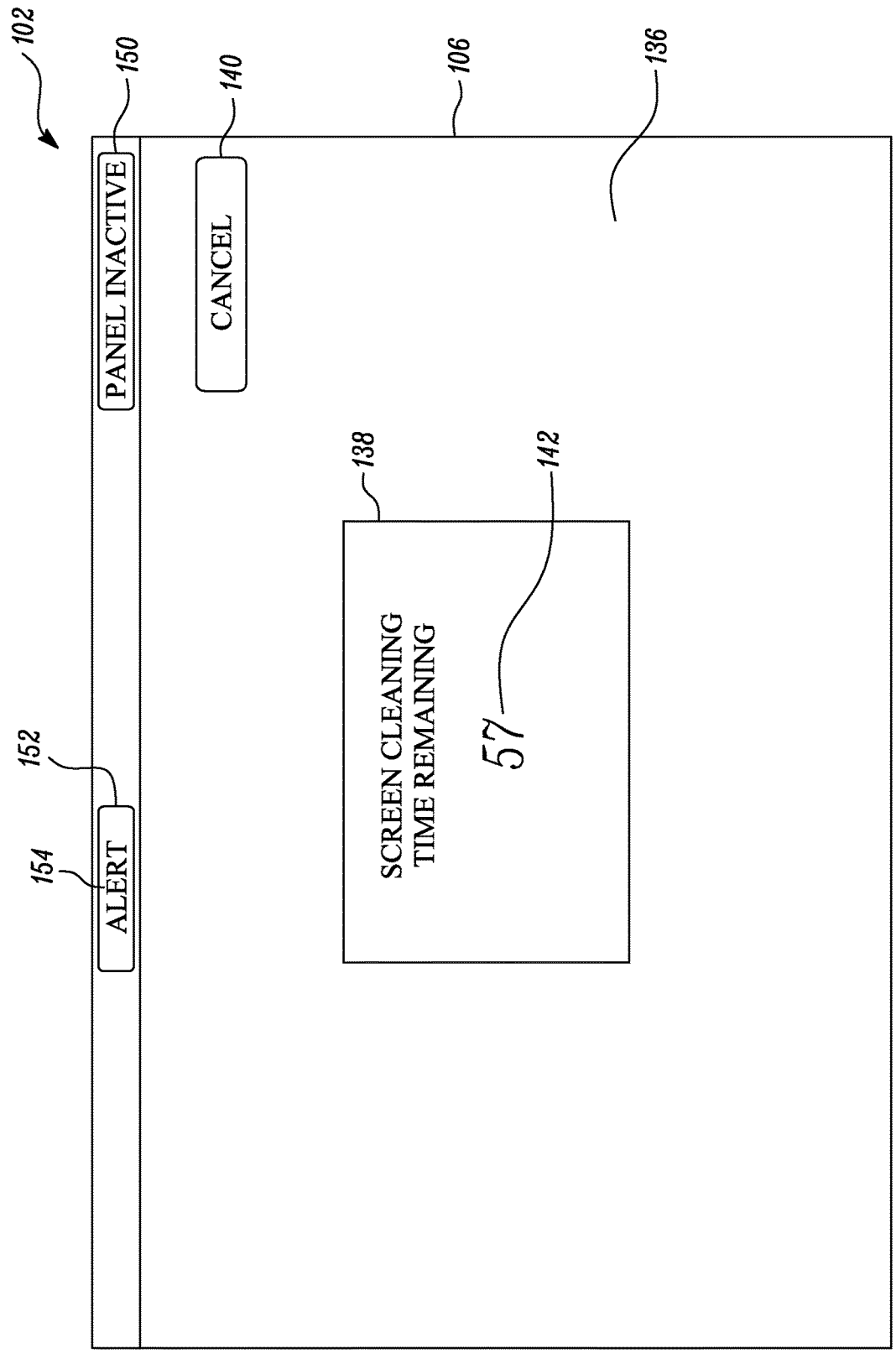
FIG. 4 illustrates a clean-up panel displayed on the display screen of FIG. 2, according to examples of the present disclosure.

As shown in FIG. 4, the controller 108 (see FIG. 1) displays a clean-up panel 136 on the display screen 106 based on the switching of the control panel 116 to the inactive state. The clean-up panel 136 is black in color. In alternate examples, the clean-up panel 136 may have any other color that may highlight presence of dirt, dust, debris, oils, and the like, on the display screen 106. The clean-up panel 136 includes a screen clean timer 138 and a deactivation icon 140 for deactivating the screen cleaning mode. The screen clean timer 138 may be displayed on the clean-up panel 136 for the first predetermined period of time.

The screen clean timer 138 may include a numerical value 142. The numerical value 142 corresponds to a time period for which the screen cleaning mode may be active. The numerical value 142 may be a countdown timer to notify the user regarding the time period for which the screen cleaning mode may be active. The screen clean timer 138 may also include a text or a graphic pertaining to an explanation of the numerical value 142. As illustrated herein, the screen clean timer 138 includes a text "SCREEN CLEAN TIME REMAINING" to notify the user that the numerical value 142 is representative of the time period for which the screen cleaning mode may be active. In alternate embodiments, the screen clean timer 138 include any other text or graphics to notify the user regarding a purpose of the numerical value 142.

Further, the deactivation icon 140 may include a text "CANCEL" provided thereon for notifying the user regarding a purpose of the deactivation icon 140. Alternatively, the deactivation icon 140 may include any other text, such as, "STOP", "DEACTIVATE", "TERMINATE", "ABORT", and the like. In some examples, the deactivation icon 140 may include a graphic, such as, a cross sign or a stop sign that notifies the user regarding the purpose of the deactivation icon 140.

Moreover, an input "I3" (see FIG. 1) provided to the deactivation icon 140 causes a second prompt screen 144 (shown in FIG. 5) to be displayed on the clean-up panel 136. Specifically, based on the input "I3", the controller 108 may initiate a deactivation process of the screen cleaning mode. In an example, the controller 108 may initiate the deactivation process of the screen cleaning mode based on a press-and-hold gesture provided to the deactivation icon 140 for a second predetermined period of time. In some examples, the second predetermined period of time may be greater than 1.5 seconds, without any limitations. In some examples, the second predetermined period of time may be about two seconds, without any limitations.

Figure 5:
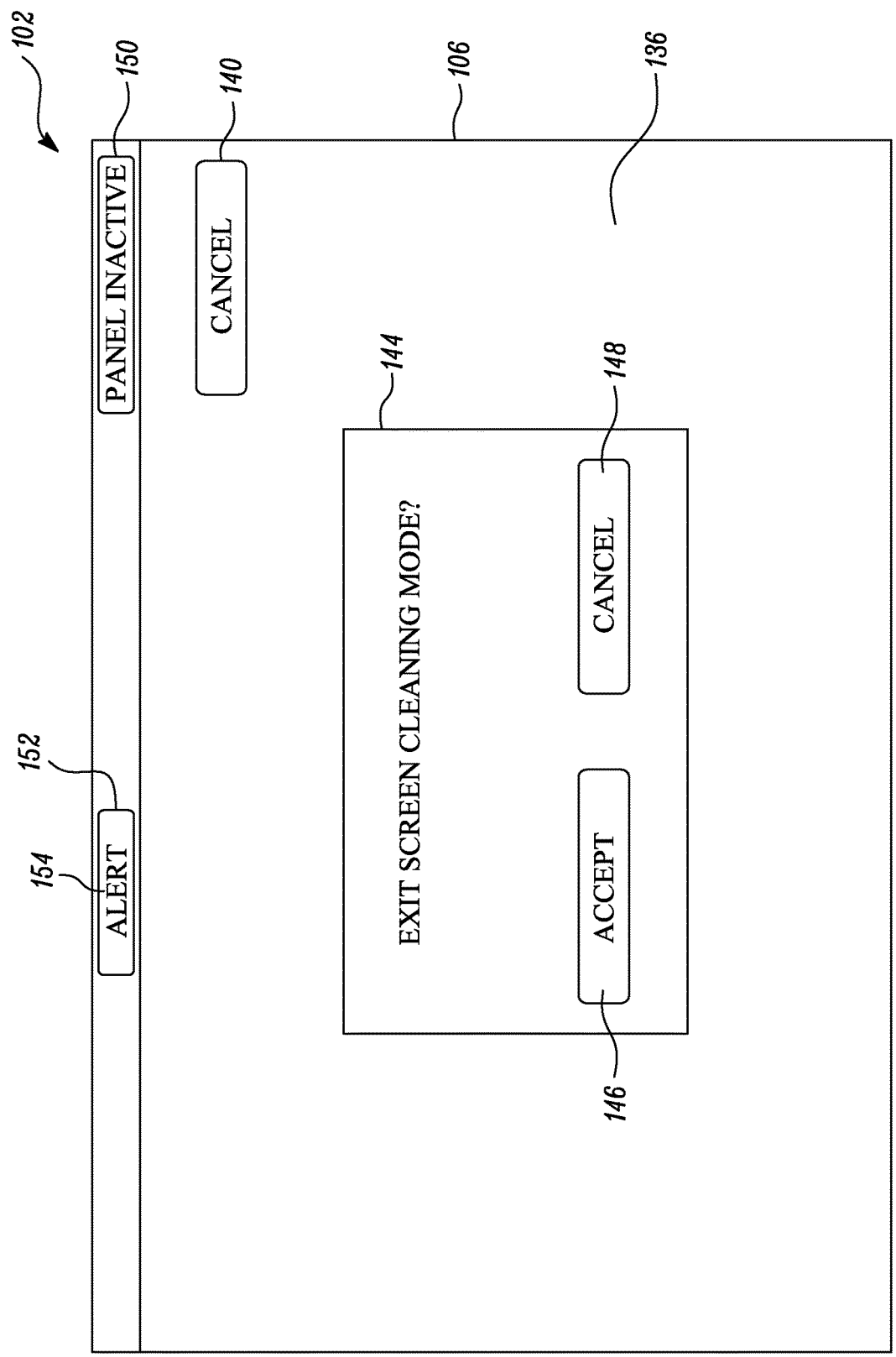
FIG. 5 illustrates a second prompt screen displayed on the clean-up panel of FIG. 4, according to examples of the present disclosure.

Further, the second prompt screen 144 allows a continuation of the screen cleaning mode or the deactivation of the screen cleaning mode. As illustrated in FIG. 5, the second prompt screen 144 includes a third icon 146 and a fourth icon 148. The third icon 146 may allow the user to continue with the deactivation process of the screen cleaning mode. The third icon 146 may include a text "ACCEPT" provided thereon for notifying the user regarding a purpose of the third icon 146. Further, the fourth icon 148 may allow the user to cancel the deactivation process of the screen cleaning mode. The fourth icon 148 may include a text "CANCEL" provided thereon for notifying the user regarding a purpose of the fourth icon 148. It should be noted that the third and fourth icons 146, 148 may include any other texts or graphics that notifies the user regarding the purpose of the third and fourth icons 146, 148, as per application requirements. For example, the fourth icon 148 may include a graphic, such as, a cross sign or a stop sign.

As illustrated in FIGS. 4 and 5, the clean-up panel 136 also includes one or more notification banners. For example, the clean-up panel 136 may include a first notification banner 150 and a second notification banner 152. The first notification banner 150 may indicate a status of the control panel 116. For example, the first notification banner 150 may notify the user whether the control panel 116 is in the active state or the inactive state. It should be noted that the first notification banner 150 may be present on the control panel 116 even when the screen cleaning mode is not active (as illustrated in FIG. 2).

As illustrated in FIG. 5, the first notification banner 150 includes a text "PANEL INACTIVE" provided thereon to notify the user that the control panel 116 is in the inactive state. Alternatively, the first notification banner 150 may include any other text or graphics that notifies the user that the control panel 116 is in the inactive state. Moreover, when the control panel 116 is in the active state, the first notification banner 150 includes a text "PANEL ACTIVE" (see FIGS. 2 and 3) to notify the user that the control panel 116 is in the active state.

Further, the controller (see FIG. 1) may receive input signals corresponding to diagnostics information related to various components of the work machine 104. It should be noted that the diagnostics information may be categorized into one or more categories. For example, the diagnostics information may be categorized into a low priority category, a medium priority category, and a high priority category.

Further, the controller 108 generates a notification 154 indicative of the diagnostics information associated with one or more components of the work machine 104 on the clean-up panel 136. The one or more components may include the power source 110 (see FIG. 1), the transmission system 112 (see FIG. 1), the propulsion system 114 (see FIG. 1), or any other component of the work machine 104. More particularly, if the controller 108 determines that the diagnostics information belongs to the medium priority category, the controller 108 may generate and transmit the notification 154 to the display screen 106 for notifying the user regarding the diagnostics information. Further, the second notification banner 152 may display the notification 154 indicative of the diagnostics information associated with the one or more components of the work machine 104. The notification 154 includes a text "ALERT" herein. Alternatively, the notification 154 may include the diagnostics information instead of the text "ALERT". In another example, the second notification banner 152 may include any other text, such as, "ALARM", one or more graphics, a flashing light of a particular color, such as, red, and the like, that may notify the user regarding the diagnostics information. In some examples, the user interface 104 may generate audio inputs, such as, a buzzer or an audio message for notifying the user regarding the diagnostics information, without any limitations.

Further, if the controller 108 determines that the diagnostics information belongs to the low priority category, the controller 108 may not generate the notification 154 when the screen cleaning mode is active. In some examples, the controller 108 may generate an alert or notification to notify the user regarding the diagnostics information after the deactivation of the screening cleaning mode.

Moreover, in some examples, the controller 108 is configured to deactivate the screen cleaning mode based on receipt of the diagnostics information associated with the one or more components of the work machine 104. More particularly, if the controller 108 determines that the diagnostics information belongs to the high priority category, the controller 108 may deactivate the screen cleaning mode so that the machine operator can take control of the user interface 102 for controlling the work machine 104.

INDUSTRIAL APPLICABILITY

The present disclosure relates to the system 100 and a method 600 for activating the screen cleaning mode for the user interface 102. The system 100 and the method 600 described herein may allow easy and quick disabling of the user interface 102 before initiating a screen cleaning process of the display screen 106. The screen cleaning mode may be activated based on the user input "I1". When the screen cleaning mode is activated, the control panel 116 is switched to the inactive state. As the control panel 116 is in the inactive state, a possibility of any inadvertent activation or deactivation of the components/systems of the work machine 104 may be eliminated.

Further, the screen cleaning mode described herein does not affect any ongoing operations associated with the work machine 104. The screen cleaning mode merely switches the control panel 116 to the inactive state. Furthermore, the screen cleaning mode is activated based on a two-step activation process. More particularly, the user may provide the user input "I1" to the activation icon 126, which in turn causes the first prompt screen 130 to be displayed on the display screen 106. Further, the screen cleaning mode is activated only when the user presses the first icon 132 on the first prompt screen 130. The two-step activation process ensures that the screen cleaning mode is not unintentionally activated by the user. Further, the controller 108 may deactivate the screen cleaning mode after the first predetermined period of time and switch the control panel 116 to the active state.

Moreover, the screen cleaning mode may be deactivated based on a two-step deactivation process. More particularly, when the user provides the press-and-hold gesture to the deactivation icon 140 for the second predetermined period of time, the second prompt screen 144 is displayed on the clean-up panel 136. Further, the screen cleaning mode is deactivated only when the user presses the third icon 146 on the second prompt screen 144. The two-step deactivation process ensures that the screen cleaning mode is not unintentionally deactivated by the user while cleaning the display screen 106.

Additionally, the clean-up panel 136 that is displayed on the display screen 106 may allow efficient cleaning of the display screen 106. More particularly, the clean-up panel 136 is substantially blank and may be black in color which may highlight defects present on the display screen 106. Further, the clean-up panel 136 may always be black in color irrespective of a current display mode of the display screen 106. Moreover, the clean-up panel may include the second notification banner 152 that may provide the notification 154 to the user as and when the diagnostics information of the medium priority category is determined by the controller 108. Accordingly, the machine operator may decide if the screen cleaning mode should be deactivated so that the machine operator can take control of the work machine 104.

Moreover, the first predetermined time period for which the screen cleaning mode remains active may be configurable by the user. Thus, in situations wherein the display screen 106 needs extensive cleaning, the user may increase the first predetermined period of time. Additionally, the controller 108 may deactivate the screen cleaning mode and switch the control panel 116 to the active state, as and when the controller 108 determines the diagnostics information of the high priority category. Such a technique may allow the user to take immediate charge of the user interface 102 to control one or more operations related to the work machine 104.

Figure 6:
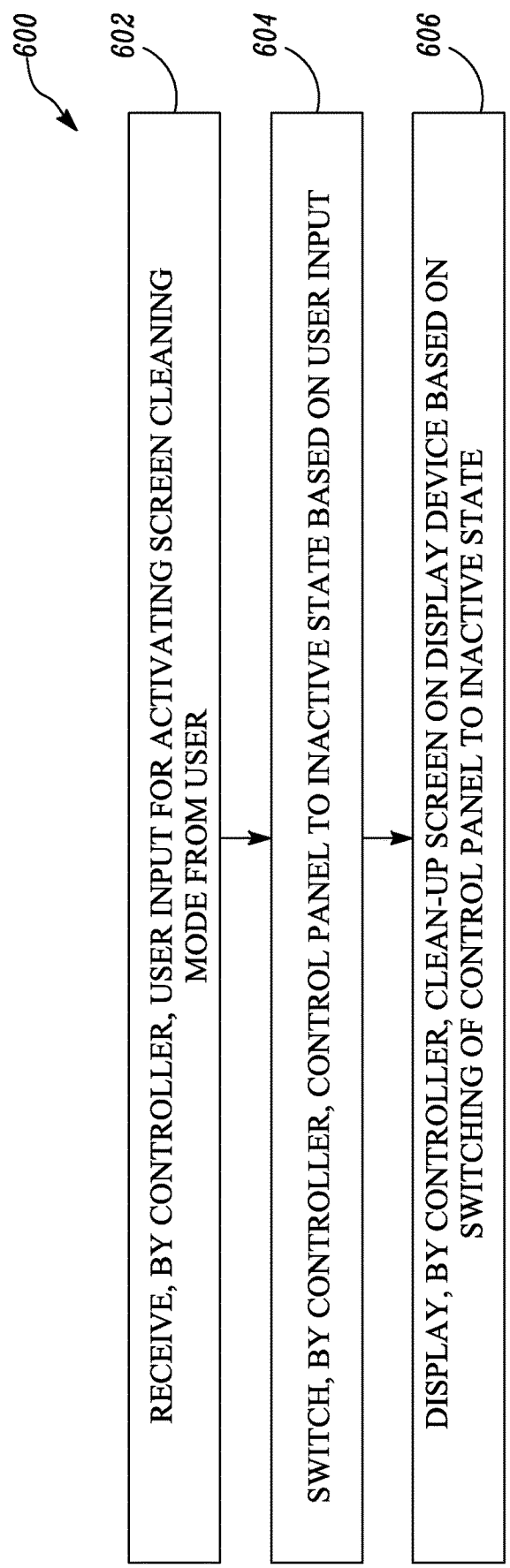
FIG. 6 illustrates a flowchart for activating the screen cleaning mode for the user interface associated with the work machine, according to examples of the present disclosure.

FIG. 6 illustrates a flowchart for the method 600 for activating the screen cleaning mode for the user interface 102 associated with the work machine 104. The user interface 102 includes the display screen 106 that displays the control panel 116 including the number of control icons 118 for controlling the one or more operations of the work machine 104. At step 602, the controller 108 receives the user input "I1" for activating the screen cleaning mode from the user. The user input "I1" is provided to the activation icon 126 on the display screen 106, such that the user input "I1" to the activation icon 126 causes the first prompt screen 130 to be displayed on the display screen 106. The first prompt screen 130 allows activation of the screen cleaning mode for the first predetermined period of time.

At step 604, the controller 108 switches the control panel 116 to the inactive state based on the user input "I1". The control panel 116 is switched to the inactive state based on the masking of the number of control icons 118. At step 606, the controller 108 displays the clean-up panel 136 on the display screen 106 based on the switching of the control panel 116 to the inactive state. The clean-up panel 136 includes the screen clean timer 138 and the deactivation icon 140 for deactivating the screen cleaning mode.

Further, the user provides the input "I3" to the deactivation icon 140, such that the input "I3" causes the second prompt screen 144 to be displayed on the clean-up panel 136. The second prompt screen 144 allows the continuation of the screen cleaning mode or the deactivation of the screen cleaning mode. Furthermore, the controller 108 displays the second prompt screen 144 on the clean-up panel 136 based on the press-and-hold gesture provided to the deactivation icon 140 for the second predetermined period of time.

In one example, the controller 108 also generates the notification 154 indicative of the diagnostics information associated with the one or more components of the work machine 104 on the clean-up panel 136. In another example, the controller 108 deactivates the screen cleaning mode based on the receipt of the diagnostics information associated with the one or more components of the work machine 104.

It may be desirable to perform one or more of the step shown in FIG. 6 in an order different from that depicted. Furthermore, various steps could be performed together.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof

The invention claimed is:

1. A system for activating a screen cleaning mode for a user interface associated with a work machine, the system comprising:
   a display screen associated with the user interface, the display screen being configured to display a control panel including a plurality of control icons for controlling one or more operations of the work machine; and
   a controller communicably coupled to the display screen, wherein the controller is configured to:
      receive a user input for activating the screen cleaning mode from a user;
      switch the control panel to an inactive state based on the user input, wherein the control panel is switched to the inactive state based on a masking of the plurality of control icons;
      display a clean-up panel on the display screen based on the switching of the control panel to the inactive state, wherein the clean-up panel includes a screen clean timer and a deactivation icon for deactivating the screen cleaning mode; and
      generate a notification indicative of a diagnostics information associated with at least one component of the work machine other than the display screen,
      wherein the controller is configured to deactivate the screen cleaning mode based on receipt of the diagnostics information.

2. The system of claim 1, wherein the user input is provided to an activation icon on the display screen, such that the user input to the activation icon causes a first prompt screen to be displayed on the display screen, and wherein the first prompt screen allows activation of the screen cleaning mode for a first predetermined period of time.

3. The system of claim 2, wherein the first predetermined period of time is from about 30 seconds to about 120 seconds.

4. The system of claim 2, wherein the first predetermined period of time is configurable based on an input from the user.

5. The system of claim 1, wherein the clean-up panel is black in color.

6. The system of claim 1, wherein an input provided to the deactivation icon causes a second prompt screen to be displayed on the clean-up panel, and wherein the second prompt screen allows at least one of continuation of the screen cleaning mode and deactivation of the screen cleaning mode.

7. The system of claim 6, wherein the controller is configured to display the second prompt screen on the clean-up panel based on a press-and-hold gesture provided to the deactivation icon for a second predetermined period of time.

8. A method for activating a screen cleaning mode for a user interface associated with a work machine, wherein the user interface includes a display screen configured to display a control panel including a plurality of control icons for controlling one or more operations of the work machine, the method comprising:
   receiving, by a controller, a user input for activating the screen cleaning mode from a user;
   switching, by the controller, the control panel to an inactive state based on the user input, wherein the control panel is switched to the inactive state based on a masking of the plurality of control icons;
   displaying, by the controller, a clean-up panel on the display screen based on the switching of the control panel to the inactive state, wherein the clean-up panel includes a screen clean timer and a deactivation icon for deactivating the screen cleaning mode;
   generating, by the controller, a notification indicative of a diagnostics information associated with at least one component of the work machine other than the display screen on the clean-up panel; and
   deactivating, by the controller, the screen cleaning mode based on receipt of the diagnostics information.

9. The method of claim 8 further comprising providing the user input to an activation icon on the display screen, such that the user input to the activation icon causes a first prompt screen to be displayed on the display screen, wherein the first prompt screen allows activation of the screen cleaning mode for a first predetermined period of time.

10. The method of claim 8 further comprising providing, by the user, an input to the deactivation icon, such that the input causes a second prompt screen to be displayed on the clean-up panel, wherein the second prompt screen allows at least one of continuation of the screen cleaning mode and deactivation of the screen cleaning mode.

11. The method of claim 10 further comprising displaying, by the controller, the second prompt screen on the clean-up panel based on a press-and-hold gesture provided to the deactivation icon for a second predetermined period of time.

12. A user interface associated with a work machine, the user interface comprising:
   a display screen configured to display a control panel including a plurality of control icons for controlling one or more operations of the work machine; and a controller communicably coupled to the display screen, the controller being configured to activate a screen cleaning mode for the display screen, wherein the controller is configured to:
   receive a user input for activating the screen cleaning mode from a user;
   switch the control panel to an inactive state based on the user input, wherein the control panel is switched to the inactive state based on a masking of the plurality of control icons;
   display a clean-up panel on the display screen based on the switching of the control panel to the inactive state, wherein the clean-up panel includes a screen clean timer and a deactivation icon for deactivating the screen cleaning mode;
   generate a notification indicative of a diagnostics information associated with at least one component of the work machine other than the display screen; and
   deactivate the screen cleaning mode based on receipt of the diagnostics information.

13. The user interface of claim 12, wherein the user input is provided to an activation icon on the display screen, such that the user input to the activation icon causes a first prompt screen to be displayed on the display screen, and wherein the first prompt screen allows activation of the screen cleaning mode for a first predetermined period of time.

14. The user interface of claim 12, wherein the clean-up panel is black in color.

15. The user interface of claim 12, wherein an input provided to the deactivation icon causes a second prompt screen to be displayed on the clean-up panel, and wherein the second prompt screen allows at least one of continuation of the screen cleaning mode and deactivation of the screen cleaning mode.

* * * * *